United States Patent
Hayashi et al.

(10) Patent No.: US 7,483,616 B2
(45) Date of Patent: Jan. 27, 2009

(54) OPTICAL WAVEGUIDE

(75) Inventors: Nobuhiko Hayashi, Osaka (JP); Keiichi Kuramoto, Kadoma (JP); Youhei Nakagawa, Hirakata (JP); Mitsuaki Matsumoto, Hirakata (JP); Hitoshi Hirano, Nishinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/730,637

(22) Filed: Apr. 3, 2007

(65) Prior Publication Data

US 2007/0189690 A1    Aug. 16, 2007

Related U.S. Application Data

(62) Division of application No. 11/057,255, filed on Feb. 15, 2005, now abandoned.

(30) Foreign Application Priority Data

Mar. 18, 2004   (JP)   ................. 2004-78014

(51) Int. Cl.
    *G02B 6/10*    (2006.01)
(52) U.S. Cl. ................. 385/132; 385/129; 385/131
(58) Field of Classification Search ......... 385/129–132, 385/45
    See application file for complete search history.

(56) References Cited

U.S. PATENT DOCUMENTS

| | | | |
|---|---|---|---|
| 6,304,706 B1 * | 10/2001 | Sugita et al. | ................. 385/129 |
| 6,563,993 B1 | 5/2003 | Imamura et al. | |
| 6,714,711 B1 | 3/2004 | Lieberman et al. | |
| 7,016,586 B2 * | 3/2006 | Zoorob et al. | ................. 385/129 |
| 2002/0039475 A1 | 4/2002 | Furuyama | |
| 2002/0122891 A1 | 9/2002 | Arakawa et al. | |
| 2003/0169990 A1 | 9/2003 | Rio et al. | |
| 2004/0013376 A1 | 1/2004 | Mikolas | |
| 2005/0207705 A1 * | 9/2005 | Laurent-Lund | ................. 385/45 |
| 2006/0153511 A1 | 7/2006 | Franklin et al. | |

FOREIGN PATENT DOCUMENTS

| | | |
|---|---|---|
| JP | 8-094869 | 4/1996 |
| JP | 8-184701 | 7/1996 |
| JP | 09-080273 | 3/1997 |
| JP | 9-274116 | 10/1997 |

(Continued)

OTHER PUBLICATIONS

Japanese Office Action issued in Patent Application No. JP 2004-078014 dated on Sep. 16, 2008.

(Continued)

*Primary Examiner*—Charlie Peng
(74) *Attorney, Agent, or Firm*—McDermott Will & Emery LLP

(57) ABSTRACT

Disclosed herein is an optical waveguide comprising a core layer to be an optical transmission region, an upper clad layer and a lower clad layer covering the core layer, in which the core layer, the upper clad layer and the lower clad layer are formed from resin materials, characterized in that a microlens made of a material having a higher refractive index than that of a material constituting said core layer is disposed in the vicinity of an end face of said core layer.

3 Claims, 19 Drawing Sheets

FOREIGN PATENT DOCUMENTS

| | | |
|---|---|---|
| JP | 10-225995 | 8/1998 |
| JP | 2001-103236 | 4/2001 |
| JP | 2001-116944 | 4/2001 |
| JP | 2001-242338 | 9/2001 |
| JP | 2002-022991 A | 1/2002 |
| JP | 2002-258081 | 9/2002 |
| JP | 2002-269800 A | 9/2002 |
| JP | 2003-043285 | 2/2003 |
| JP | 2003-121677 | 4/2003 |
| JP | 2003-215792 | 7/2003 |

OTHER PUBLICATIONS

Miyadera, Nobuo, "Polymeric Materials for an optical waveguide." Optical Alliance, 1999, No. 2, pp. 13-19, "Polymer Materials for Optical Waveguide.".

* cited by examiner

FIG. 1
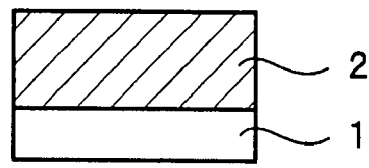
(a)
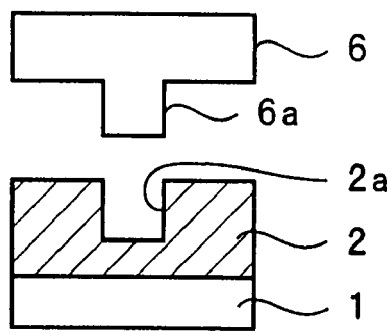
(b)
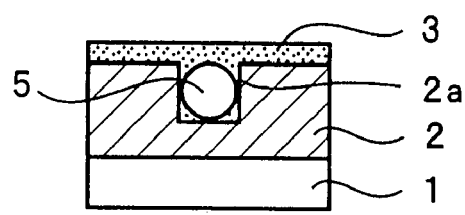
(c)
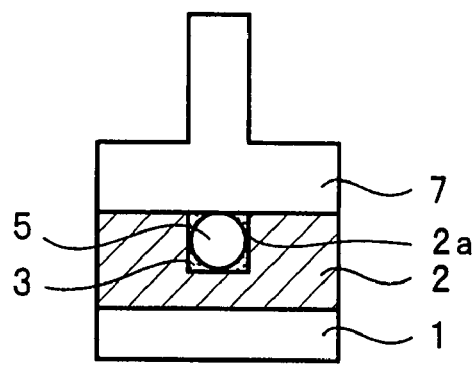
(d)
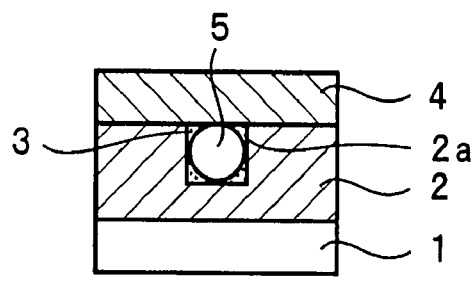
(e)

F I G. 7
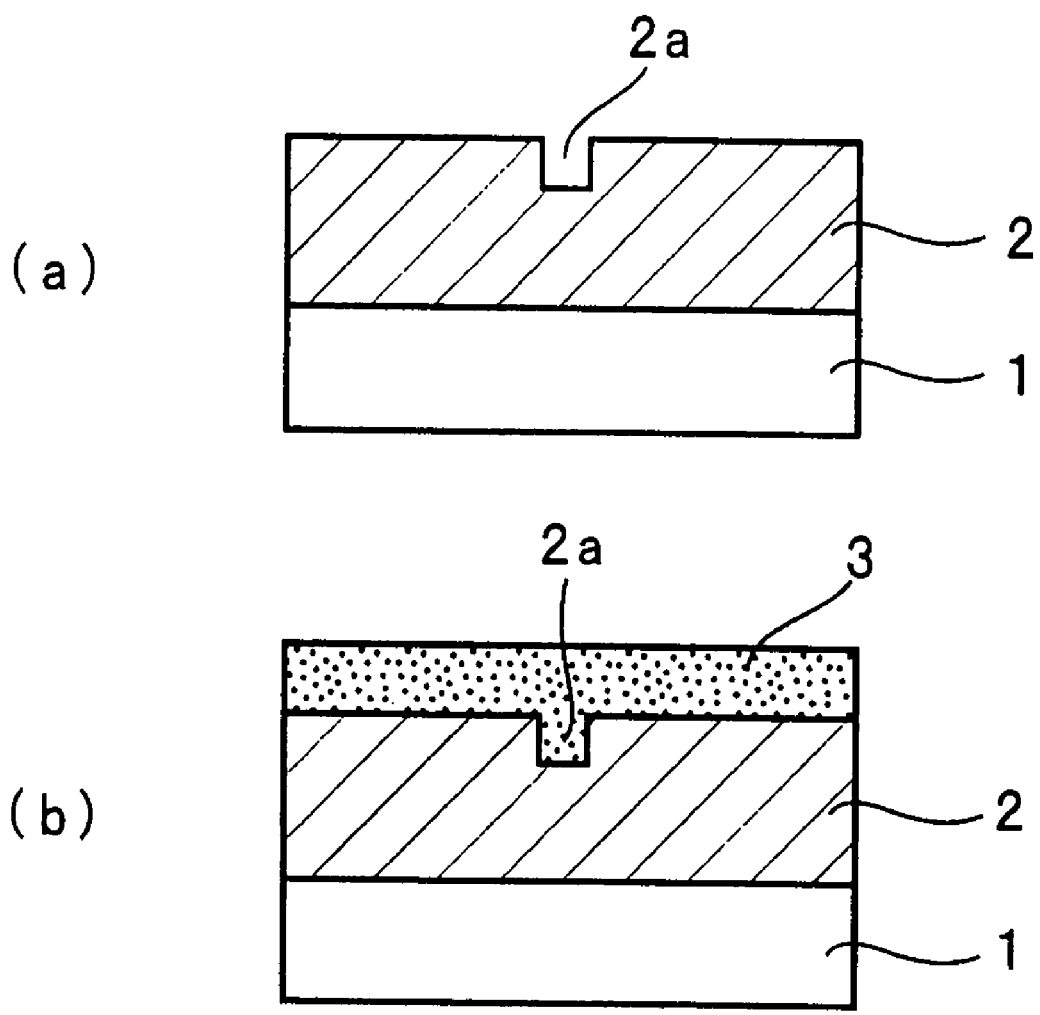

FIG. 18
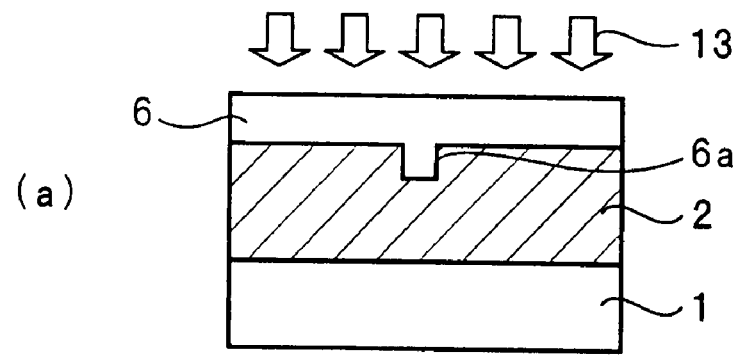
(a)
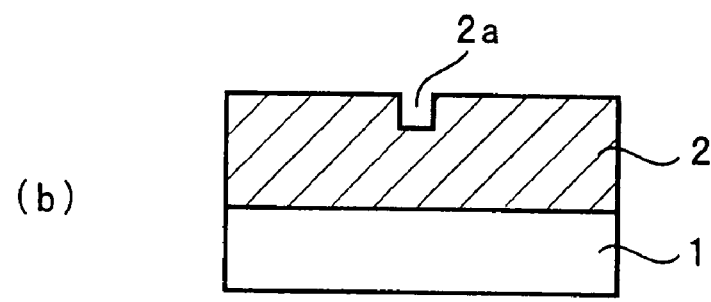
(b)
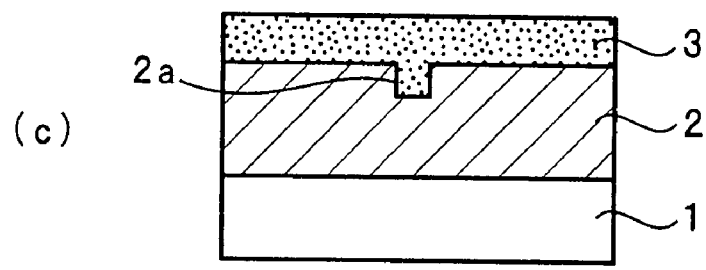
(c)
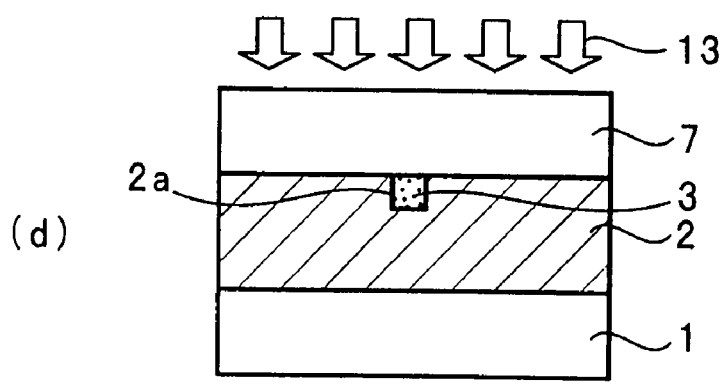
(d)

FIG. 19
Portion Having Light Scattering Region    Portion Having No Light Scattering Region
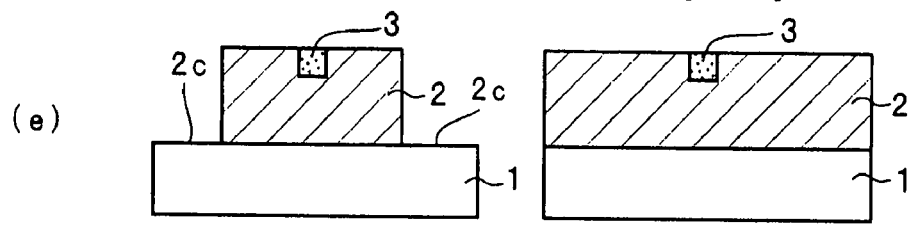
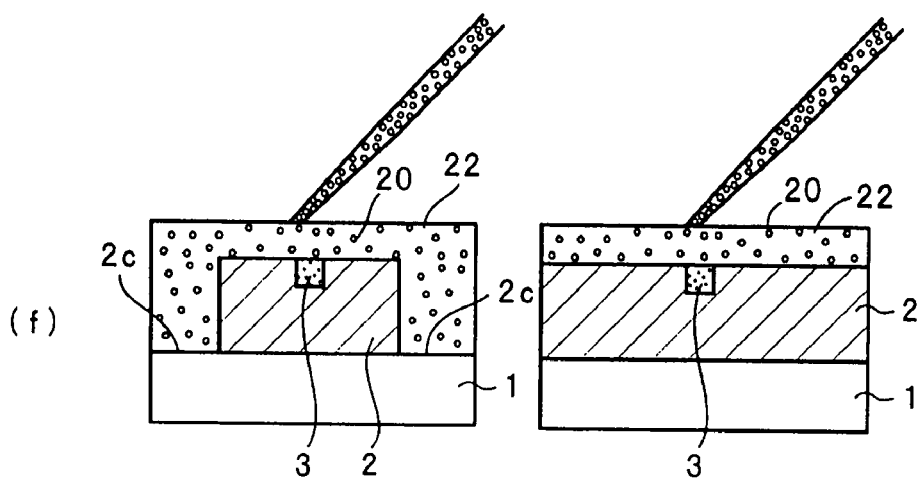
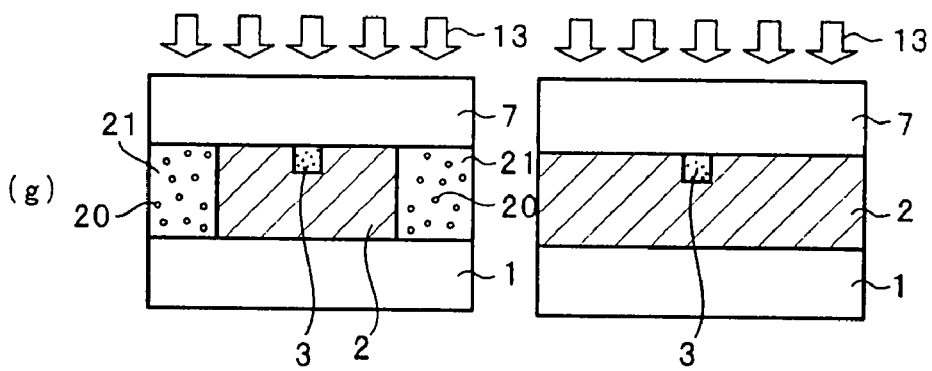
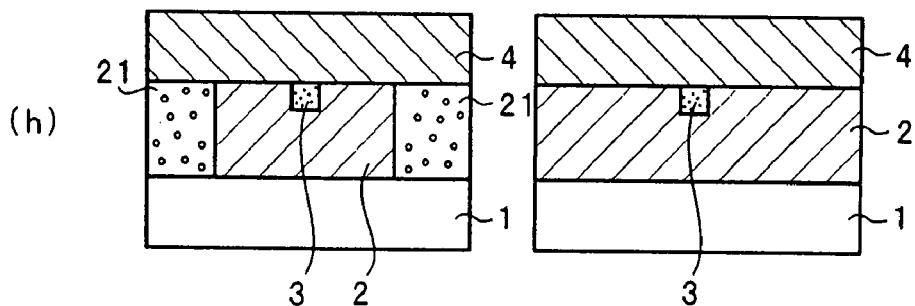

F I G. 2 4
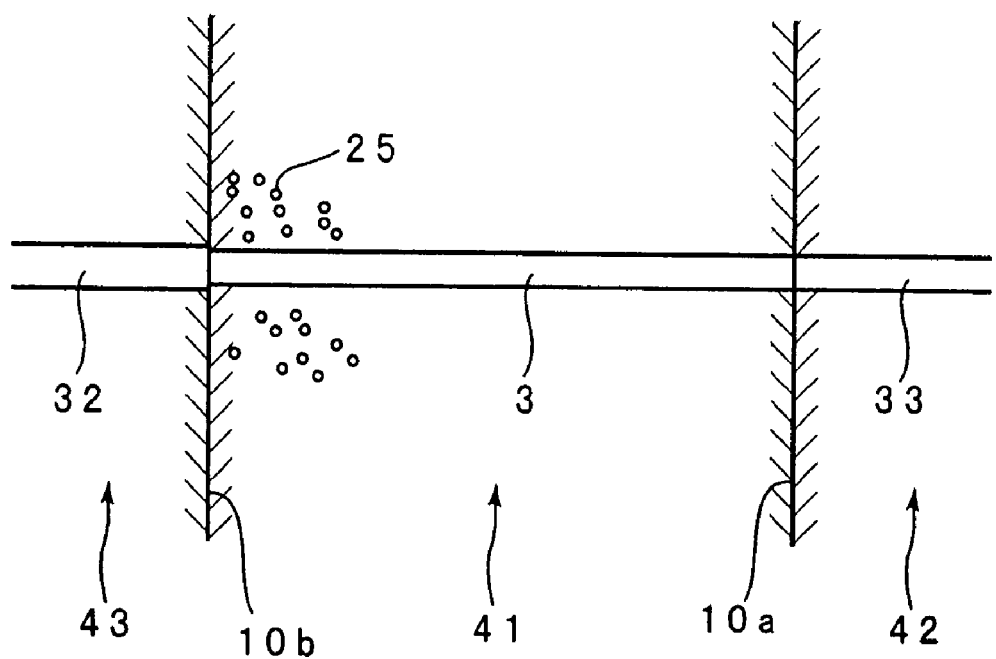

FIG. 25
(a) 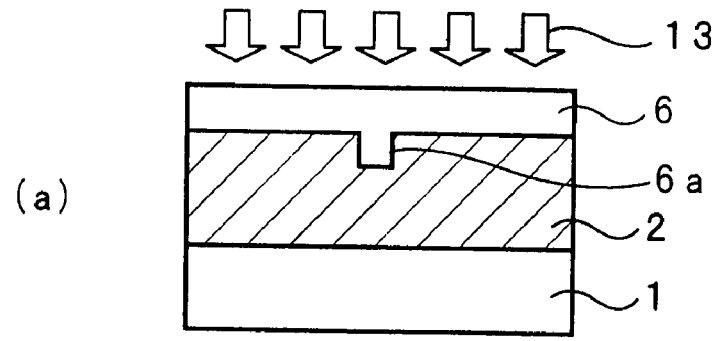
(b) 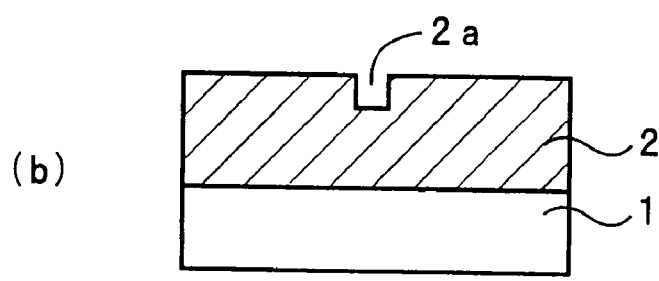
(c) 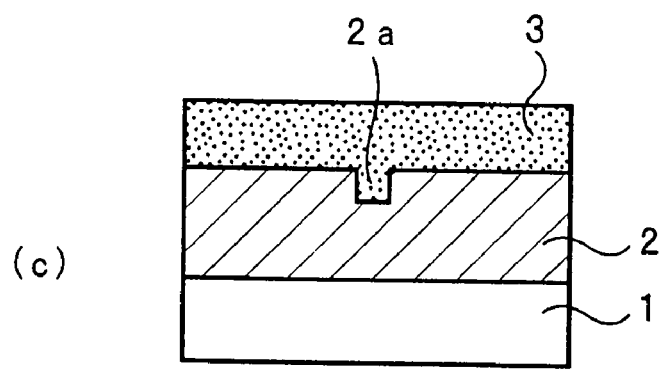
(d) 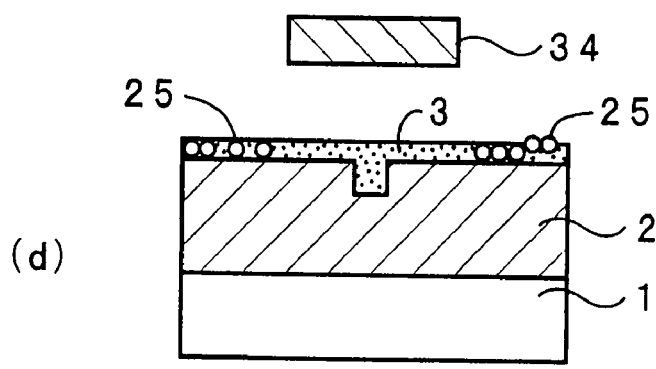

OPTICAL WAVEGUIDE

RELATED APPLICATIONS

The present application is a Divisional of U.S. application Ser. No. 11/057,255, filed on Feb. 15, 2005, now abandoned which claims priority from Japanese Application No. JP 2004-078014, filed on Mar. 18, 2004 the contents of which are hereby incorporated by reference.

BACKGROUND OF THE INVENTION

1. Field of the Invention

The present invention relates to an optical waveguide.

2. Description of the Related Art

In recent years, under circumstances where the trend of Internet toward broadband moves forward, it is necessary to reduce the cost of devices for optical communication by a large amount for widespread use of access such as FTTH. Optical transmitter and receiver modules to convert light to electrical signals are used in terminals of equipment for optical communication as a device for optical communication. In order to bring this optical transmitter and receiver module down in size and cost, there is proposed a method in which an optical waveguide, being a part within the module, is formed from an organic polymeric material (Nobuo Miyadera, "Polymeric materials for an optical waveguide", Optical Alliance, 1999, No. 2, p. 13).

For example, a lower clad layer is formed on a substrate, and on this lower clad layer, an optical transmission layer consisting of an organic polymeric material is formed. In this optical transmission layer, a pattern is formed and an unnecessary portion is eliminated by reactive ion etching (RIE) and ultraviolet (UV) irradiation using photolithography. On the optical transmission layer thus formed, an upper clad layer is formed. In many case, the lower clad layer and the upper clad layer are also formed from an organic polymeric material.

SUMMARY OF THE INVENTION

It is a first object of the present invention to provide an optical waveguide which can be easily fabricated and has a function of a lens at an end portion.

It is a second object of the present invention to provide an optical waveguide of which optical transmission characteristics can be easily measured externally.

It is a third object of the present invention to provide an optical waveguide which is easy to be aligned in being connected to another part.

It is a fourth object of the present invention to provide an optical waveguide in which a thickness of a residual layer formed between an upper clad layer and a lower clad layer around a core layer can be easily controlled.

An optical waveguide according to a first aspect of the present invention is an optical waveguide comprising a core layer to be an optical transmission region, an upper clad layer covering the core layer and a lower clad layer, in which the core layer, the upper clad layer and the lower clad layer are formed from resin materials, and is characterized in that a microlens consisting of a material having a higher refractive index than that of a material constituting the core layer is located in the vicinity of an end face of the core layer.

In accordance with the first aspect of the present invention, it is possible to locate the microlens in the vicinity of an end face in the core layer to form the core layer and simultaneously to fix the microlens at a predetermined position. Therefore, the optical waveguide which can be easily fabricated and has a function of a lens can be made.

In the first aspect, it is preferred that the microlens has a substantially spherical or cylindrical shape. When the core layer is formed in a groove formed in the lower clad layer or the upper clad layer, the microlens can be positioned by contacting the microlens with at least two inner wall surfaces in the groove. Therefore, it is possible to form the core layer and to secure the microlens in a state of thus positioning the microlens.

A configuration of the groove constituting the core layer is not particularly limited and includes, for example, a rectangular configuration, a "IV" configuration and a pentagonal configuration. When the groove has a rectangular configuration, the microlens can be positioned by a side wall and a bottom of the groove by using the groove having the width approximately equivalent to a diameter of the microlens. And, when the groove is composed of inclined surfaces, bottom portions of which intersect, such as a "V" configuration or a pentagonal configuration, a microlens having a spherical shape or a cylindrical shape can be positioned by meeting with these two inclined surfaces.

A microlens used in the first aspect is not particularly limited as long as it can be located in the core layer and has transparency for a waveguided light, and includes for example, substances formed from resin or glass. For example, perfectly spherical polystyrene particles which are used as a standard sample of a particle size distribution analyzer or a particle counter is given are given.

An optical waveguide according to a second aspect of the present invention is an optical waveguide comprising a core layer to be an optical transmission region, an upper clad layer covering the core layer and a lower clad layer, in which the core layer, the upper clad layer and the lower clad layer are formed from resin materials, and is characterized in that the optical waveguide is constructed in such a way that a light scattering region, in which bubbles or particles are contained, is formed in part of the core layer and a waveguided light in the core layer is scattered by the light scattering region and part of the scattered light can be extracted out of the optical waveguide.

In accordance with the second aspect of the present invention, since it is possible to scatter the waveguided light in the core layer with the light scattering region and to extract part of the scattered light out of the optical waveguide, the extracted light can be monitored by a photodetector such as a photodiode. Therefore, optical transmission characteristics in the optical waveguide can be easily measured externally.

A diameter of the bubble or particle in the second aspect is preferably at least a wavelength of the waveguided light in order to scatter the waveguided light efficiently.

Bubbles to be contained in the core layer can be formed by injecting a material for forming a core layer containing bubbles into a groove of the core layer. The material for forming a core layer containing bubbles can be prepared by bubbling nitrogen gas into a region of the material for forming a core layer through a porous filter.

Particles contained in the light scattering region is not particularly limited as long as it can scatter light and include, for example, glass particles, resin particles and metal particles. A diameter of particle is preferably at least a wavelength of the waveguided light as described above, and for example, it is preferably within a range of 2 to 4 μm in the case of a single mode waveguide and preferably within a range of 2 to 10 μm in the case of a multi mode waveguide.

Also, A diameter of the above-mentioned bubble is preferably within such a range.

An optical waveguide according to a third aspect of the present invention is an optical waveguide comprising a core layer to be an optical transmission region, an upper clad layer covering the core layer and a lower clad layer, in which the core layer, the upper clad layer and the lower clad layer are formed from resin materials, and is characterized in that a light scattering region, in which bubbles or particles are contained, is formed in part of the upper clad layer and/or the lower clad layer.

In the third aspect, the light scattering region is formed in part of the upper clad layer and/or the lower clad layer. By forming the light scattering region in the upper clad layer or the lower clad layer, part of a waveguided light transmitting through the core layer can be extracted externally. Therefore, by detecting this extracted light, optical transmission characteristics in the optical waveguide can be easily measured externally as with the second aspect.

Further, by forming the light scattering region in the upper clad layer or the lower clad layer, this light scattering region can be easily identified externally. By forming this light scattering region in a position to facilitate identifying an end portion of the core layer, alignment of the core layer becomes easy in connecting the optical waveguide to another part.

In the third aspect, bubbles to be contained in the light scattering region can be formed by injecting a material for forming a clad layer containing bubbles into a predetermined position for the light scattering region to be formed. The material for forming a clad layer containing bubbles can be prepared as with the material for forming a core layer containing bubbles in the second aspect.

And, as a particle in the third aspect, a substance similar to a particle in the second aspect can be employed.

As a method of concentrating bubbles in a material for forming a clad layer at specified location, there is given, for example, a method in which bubbles are concentrated around a projection by covering a clad layer with a mold having a projection when curing the upper clad layer or lower clad layer.

An optical waveguide according to a fourth aspect of the present invention is an optical waveguide comprising a core layer to be an optical transmission region, an upper clad layer covering the core layer and a lower clad layer, in which the core layer, the upper clad layer and the lower clad layer are formed from resin materials, and is characterized in that spacers are located between the upper clad layer and the lower clad layer around the core layer.

In accordance with the fourth aspect, by locating spacers between the upper clad layer and the lower clad layer around the core layer, a thickness of a residual layer formed between the upper clad layer and the lower clad layer around the core layer can be easily controlled. That is, by adjusting the dimension and the location of the spacers, the thickness of the residual layer can be easily controlled.

In the fourth aspect, in both regions straddling the core layer, spacers may be located in only one region. Particularly in a curved portion of the optical waveguide, the leakage of the waveguided light to the outside of the curved portion can be suppressed by locating the spacers in only an inside region of the curved portion to relatively thin the thickness of the residual layer outside the curved portion and to relatively thicken the thickness of the residual layer inside the curved portion in order to suppress leakage of the waveguided light since the waveguided light is apt to leak outside the a curved portion.

As a spacer used in the fourth aspect, there can be used, for example, spacers which are inserted between opposed substrates in a liquid crystal display. As such a spacer, a plastic spacer, a glass spacer and the like are known and as it shape, a particle form spacer, a rod form spacer and the like are known. And, when a spacer having a small size is used, a standard sample exemplified as a microlens in the first aspect can be used.

In the first to fourth aspects of the present invention, the core layer, the upper clad layer and the lower clad layer are formed from resin base materials. As the resin base material, it is preferred to employ an organic-inorganic composite material. By employing the organic-inorganic composite material, it is possible to form an optical waveguide which has excellent optical transmission characteristics and high heat resistance, chemical resistance and mechanical strength.

The organic-inorganic composite material can be formed, for example, from an organic polymer and metal alkoxide. And, the organic-inorganic composite material may be formed from at least one kind of metal alkoxide. In this case, it is preferably formed from at least two kinds of metal alkoxides.

In the above-mentioned organic-inorganic composite material, a refractive index of an organic-inorganic composite material finally formed can be adjusted by appropriately adjusting the combination of the organic polymer and the metal alkoxide or the combination of at least two kinds of metal alkoxides.

As the metal alkoxide, metal alkoxide having a polymerizable group which is polymerized by light (ultraviolet light) or heat may be employed. In this case, it is preferred to use the metal alkoxide having a polymerizable group which is polymerized by light or heat and metal alkoxide not having the polymerizable group in combination. As the above-mentioned polymerizable group, there are given a methacryloxy group, an acryloxy group, a vinyl group, a styryl group, and the like. When the clad layer or the core layer to be cured by ultraviolet irradiation is formed from an organic-inorganic composite material containing metal alkoxide, it is preferred to contain metal alkoxide having a polymerizable group to be polymerized by light (ultraviolet light) as metal alkoxide.

When the metal alkoxide having a polymerizable group is used, it is preferred that a polymerizable group of metal alkoxide has been polymerized by light or heat.

As the metal alkoxide, there are given alkoxides of Si, Ti, Zr, Al, Sn, Zn, Nb and the like. Particularly, alkoxide of Si, Ti, or Zr is preferably used. Accordingly, alkoxysilane, titanium alkoxide, zirconium alkoxide and niobium alkoxide are preferably used, and particularly, alkoxysilane is preferably used.

As the alkoxysilane, there are given tetraethoxysilane, tetramethoxysilane, tetra-n-propoxysilane, tetraisopropoxysilane, tetra-n-butoxysilane, tetraisobutoxysilane, phenyltriethoxysilane (PhTES), phenyltrimethoxysilane (PhTMS), diphenyldimethoxysilane, diphenyldiethoxysilane and the like.

As alkoxysilane having the above-mentioned polymerizable group, there are given 3-methacryloxypropyltriethoxysilane (MPTES), 3-methacryloxypropyltrimethoxysilane (MPTMS), 3-methacryloxypropylmethyldimethoxysilane, 3acryloxypropyltrimethoxysilane, p-styryltriethoxysilane, p-styryltrimethoxysilane, vinyltrimethoxysilane, and vinyltriethoxysilane.

As the titanium alkoxide, there are given titanium isopropoxide, titanium butoxide and the like. As the zirconium alkoxide, there are given zirconium isopropoxide, zirconium butoxide and the like.

As the niobium alkoxide, there are given Niobium(V) ethoxide and the like.

Though the above-mentioned substances can be used as the metal alkoxide, it is generally possible to use the metal alkoxides expressed by formulas, $M(OR)_n$, $R'M(OR)_{n-1}$ and $R'_2M(OR)_{n-2}$, wherein M represents metal, n is 2, 3, 4 or 5, and R and R' represent an organic group. As the organic group, there are given an alkyl group, an aryl group and organic groups having the above polymerizable groups. As the metal M, there are given Si, Ti, Zr, Al, Sn, Zn, Nb and the like as described above. Further, as the alkyl group, an alkyl group having 1 to 5 carbon atoms is preferred.

In the case where the organic-inorganic composite material is formed from the organic polymer and the metal alkoxide, the organic polymer is not particularly limited as long as it can form the organic-inorganic composite material together with the metal alkoxide. As the organic polymer, there can be given, for example, a high polymer having a carbonyl group, a high polymer having a benzene ring and a high polymer having a naphthalene ring.

As the specific example of the organic polymer, there can be given, for example, polyvinyl pyrrolidone, polycarbonate, polymethyl methacrylate, polyamide, polyimide, polystyrene, polyethylene, polypropylene, epoxy resin, phenolic resin, acrylic resin, urea resin, melamine resin and the like. Polyvinyl pyrrolidone, polycarbonate, polymethyl methacrylate, polystyrene, epoxy resin and the mixture thereof are preferably used from the viewpoint of forming an organic-inorganic composite material having high optical transparency.

When the organic-inorganic composite material is cured by light (ultraviolet) irradiation, it is preferred that the organic-inorganic composite material contains a photopolymerization initiator. By containing the photopolymerization initiator, it can be cured by a slight quantity of light (ultraviolet) irradiation.

As a specific example of the photopolymerization initiator, there are given, for example, benzilketal, α-hydroxyacetophenone, α-aminoacetophenone, acylphosphine oxide, 1-hydroxy-cyclohexyl-phenyl ketone, 2-benzil-2-dimethylamino-1-(4-morpholinophenyl)-butanone-1, trichloromethyltriazin, diphenyliodonium salt, triphenylsulfonium salt and imide sulfonate.

The core layer, the upper clad layer and the lower clad layer in the present invention may be formed from an ultra violet (UV) curable resin. As such UV curable resin, there can be given, for example, epoxy UV curable resins based on an epoxy resin, acrylic UV curable resins, epoxy acrylate UV curable resins, polyurethane UV curable resins and the like.

In accordance with the first aspect of the present invention, the optical waveguide which can be easily fabricated and has a function of a lens at an end portion can be made.

In accordance with the second aspect of the present invention, the optical waveguide of which optical transmission characteristics can be easily measured externally can be made.

In accordance with the third aspect of the present invention, the optical waveguide, of which optical transmission characteristics can be easily measured externally and which is easy to be aligned in being connected to another part, can be made.

In accordance with the fourth aspect of the present invention, a thickness of a residual layer formed between an upper clad layer and a lower clad layer around a core layer can be easily controlled.

BRIEF DESCRIPTION OF THE DRAWINGS

FIG. 1 is a sectional view showing process steps of fabricating an optical waveguide of an embodiment according to a first aspect of the present invention.

FIG. 7 is a sectional view showing fabrication steps of an embodiment according to the second aspect of the present invention.

FIG. 18 is a sectional view showing fabrication steps of an embodiment according to the third aspect of the present invention.

FIG. 19 is a sectional view showing fabrication steps of an embodiment according to the third aspect of the present invention.

FIG. 24 is a plan view showing an optical waveguide of further another embodiment according to the fourth aspect of the present invention.

FIG. 25 is a view showing process steps of fabricating an optical waveguide of an embodiment according to the fourth aspect of the present invention.

BEST MODES FOR CARRYING OUT THE INVENTION

Figure 2:
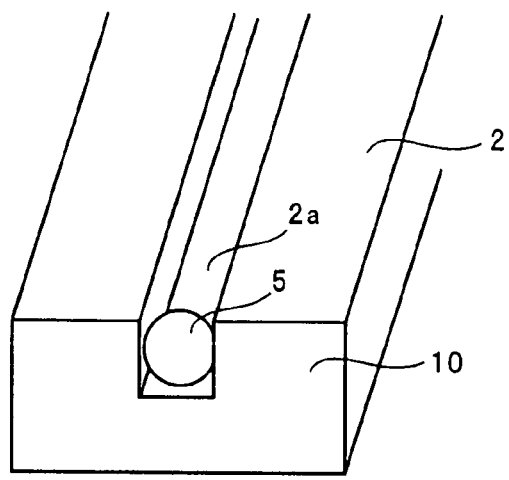
FIG. 2 is a perspective view showing a lower clad layer and a microlens in an optical waveguide of an embodiment according to the first aspect of the present invention.

Hereinafter, the present invention will be described by way of examples, but the present invention is not limited to the following examples and can be embodied by appropriately modifying within the scope of the claims without changing the gist.

FIG. 1 is a sectional view showing process steps of fabricating an optical waveguide of an embodiment according to a first aspect of the present invention. The optical waveguide of this embodiment has a structure shown in FIG. 1(e). That is, a lower clad layer 2 is provided on a substrate 1 and a core layer 3 extending along the longitudinal direction of an optical waveguide is provided at the top central portion of the lower clad layer 2. The core layer 3 is provided in a groove 2a in the lower clad layer 2. The groove 2a has a rectangular cross section. An upper clad layer 4 is provided on the core layer 3 and the lower clad layer 2. The lower clad layer 2 and the upper clad layer 4 are formed from material having a lower refractive index than that of the core layer 3. The core layer 3 can transmit light through its inside by being shrouded in the upper clad layer 4 and the lower clad layer 2.

FIG. 1(e) shows a cross section of the vicinity of an end face of the optical waveguide and a microlens 5 is located in the vicinity of an end face of the core layer 3 of the optical waveguide. In this embodiment, the microlens 5 has a substantially spherical shape. In this embodiment, the microlens 5 is formed from a spherical polystyrene particle.

Hereinafter, process steps of fabricating an optical waveguide shown in FIG. 1(e) will be described taken in conjunction with FIGS. 1(a)-1(d). In this embodiment and the following embodiments, the core layer, the lower clad layer and the upper clad layer are formed using an organic-inorganic composite material formed from alkoxysilane. The solutions for forming a core layer and for forming a clad layer were prepared as follows.

[Preparation of a Solution for Forming a Core Layer]

By mixing 5.5 ml of 3-methacryloxypropyltriethoxysilane, 5.5 ml of phenyltriethoxysilane, 1.65 ml of hydrochloric acid (2N) and 20.5 ml of ethanol and leaving the mixture standing for 24 hours, 3-methacryloxypropyltriethoxysilane and phenyltriethoxysilane are hydrolyzed and polycondensated. To 4 ml of the resulting polycondensate, 10 ml of 1-hydroxy-cyclohexyl-phenyl ketone is added as a polymerization initiator, and then by heating to 100° C., ethanol is evaporated and removed from the mixture to obtain viscous liquid. Into 1 g of this viscous liquid, 3 ml of triethylethoxysilane and 0.8 ml of trifluoroacetic anhydride are mixed and the mixture is left standing for 24 hours, and then by heating the mixture to 100° C. to be dried, excessive triethylethoxysilane and trifluoroacetic anhydride are evaporated and removed from the mixture to obtain a solution for forming a core layer.

The refractive index of an organic-inorganic composite material formed from the solution for forming a core layer is 1.519.

[Preparation of a Solution for Forming a Clad Layer]

A solution for forming a clad layer is prepared by following the same procedure as described above except for using 5.5 ml of 3-methacryloxypropyltriethoxysilane and 4.5 ml of phenyltriethoxysilane in preparation of a solution for forming a core layer described above. The refractive index of an organic-inorganic composite material formed from this solution is 1.515. An upper clad layer and a lower clad layer are formed using this solution.

[Fabricating of an Optical Waveguide]

As shown in FIG. 1(a), a solution 2 for forming a lower clad layer is added dropwise onto a glass substrate 1, and then, as shown in FIG. 1(b), a mold 6 having a projection portion 6a is pressed against the layer of the solution 2 for forming a lower clad layer and by irradiating ultraviolet light to the solution from the side of the substrate 1 in this state, the solution is cured to form a lower clad layer 2 having a groove 2a corresponding to the projection portion 6a. The width and the height of the projection portion 6a are 8 to 9 μm, respectively. Therefore, the width and the depth of the groove 2a formed in the lower clad layer 2 are 8 to 9 μm, respectively. The mold 6 is formed from resin or metal. The thickness of the lower clad layer 2 is about 50 μm.

Next, a solution for forming a core layer is added dropwise onto a region in the groove 2a of the lower clad layer 2 other than the vicinity of an end face, and a solution for forming a core layer containing a microlens is sucked up into a micropipet and this solution is added dropwise together with the microlens particle from the micropipet to the groove 2a of the vicinity of the end face in such a way that the microlens particle is positioned in the vicinity of an end face of the groove 2a while observing with a microscope. A standard particle ("DYNOSPHERES SS-072-P" manufactured by JSR Corporation, spherical polystyrene particles, average particle diameter 7 to 8 μm, refractive index 1.586) is used as a microlens.

FIG. 1(c) shows a state of locating the microlens 5 in the vicinity of an end face by following the procedure described above. Next, as shown in FIG. 1(d), a flat plate 7 is pressed against on the lower clad layer 2 and by irradiating ultraviolet light (365 nm) from the side of the glass substrate 1 with a load being applied, the solution for forming a core layer is cured to form a core layer 3.

Next, after the flat plate 7 is removed, a solution for forming an upper clad layer is added dropwise, and a flat plate is placed on this and a load is applied to this solution for several minutes to distribute the solution uniformly over all, and then by irradiating ultraviolet light (365 nm) from the side of the glass substrate 1, the solution for forming an upper clad layer is cured to form an upper clad layer 4. The thickness of the upper clad layer 4 is about 50 μm.

When a plurality of optical waveguides are simultaneously fabricated from a single optical waveguide, after a upper clad layer is formed, an optical waveguide is cut to the specified length through dicing and each optical waveguide is separated.

FIG. 2 is a perspective view showing the microlens 5 located in the vicinity of an end face of the lower clad layer 2 and the groove 2a in this embodiment. As shown in FIG. 2, in this embodiment, the microlens 5 is located in the vicinity of an end face 10 of the optical waveguide.

Figure 3:
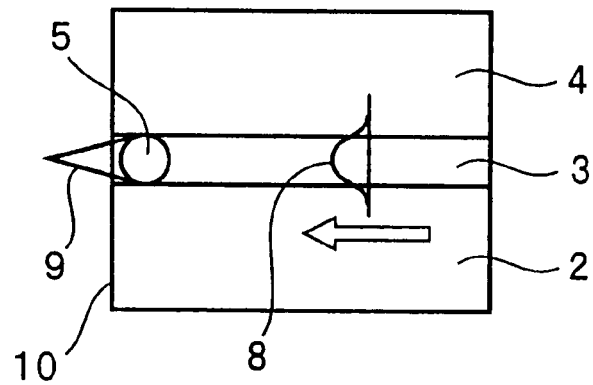
FIG. 3 is a sectional side elevation view showing an optical waveguide of an embodiment according to the first aspect of the present invention.

FIG. 3 is a sectional side elevation view showing a vicinity of an end face of the optical waveguide of this embodiment. As shown in FIG. 3, the microlens 5 is located in the vicinity of an end face 10 of the core layer 3 positioned between the lower clad layer 2 and the upper clad layer 4. By thus locating the microlens 5 in the vicinity of the end face, it is possible to focus the waveguided light 8 transmitted through the optical waveguide 3 at the vicinity of the end face to make a focused light 9.

The microlens 5 is located in the core layer 3 around the end face 10 and it is preferably located in such a way that a tip of the microlens 5 is positioned in a region extending to a position distance equivalent to a radius of the microlens 5 from the end face 10. That is, when the microlens 5 is located at the inner side of the optical waveguide, it is preferably located in such a way that the tip, on the side of the end face 10, of the microlens 5 is positioned in a region of from the position distance equivalent to a radius of the microlens 5 from the end face 10 to the end face 10. And, when the microlens 5 is located with the lens's tip being projected out of the end face 10, it is preferably located in such a way that the tip of the microlens 5 is positioned in a region of from the end face 10 to the position distance equivalent to a radius of the microlens 5 from the end face 10.

Figure 4:
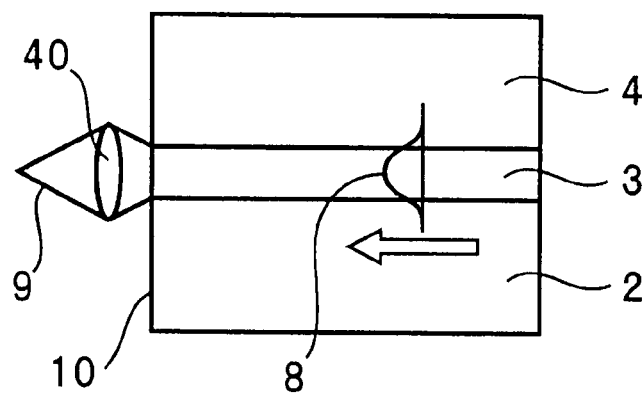
FIG. 4 is a sectional side elevation view showing a conventional optical waveguide.

FIG. 4 is a sectional side elevation view showing an arrangement of a conventional microlens. Conventionally, as shown in FIG. 4, it is required to set up a microlens 40 outside the optical waveguide and a means for securing the microlens 40 is required. And, alignment between the microlens and the core required the accuracy on the order of micrometer. For this situation, in accordance with the first aspect of the present invention, since the microlens can be located within the core layer, the microlens, it is possible to secure the microlens in the core layer to integrate it into the core layer concurrently with the formation of the core layer. Further, alignment (alignment of an optical axis) between the microlens and the core can be unnecessary.

Figure 27:
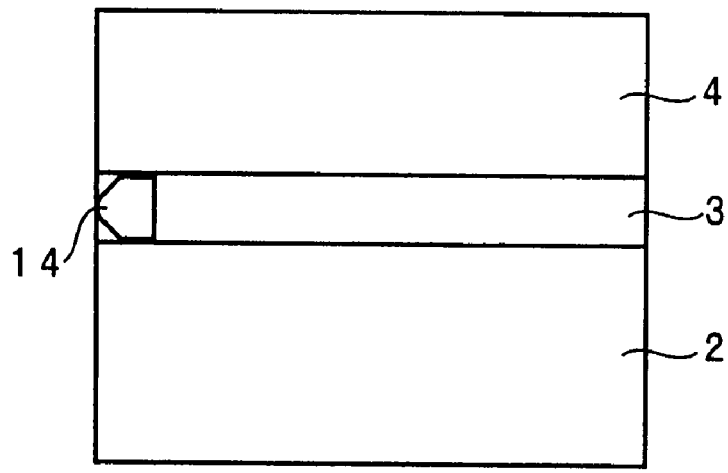
FIG. 27 is a sectional side elevation view showing an optical waveguide of another embodiment according to the first aspect of the present invention.

In the above embodiment, an article having a spherical shape has been presented as a microlens, but the microlens is not limited to such a shape in the first aspect. For example, an aspheric lens 14 may be used as shown in FIG. 27. And, a lens that lens surface is cylindrical, a cylindrical lens such as a rod lens and further a lens having a square prism configuration may be used.

Figure 28:
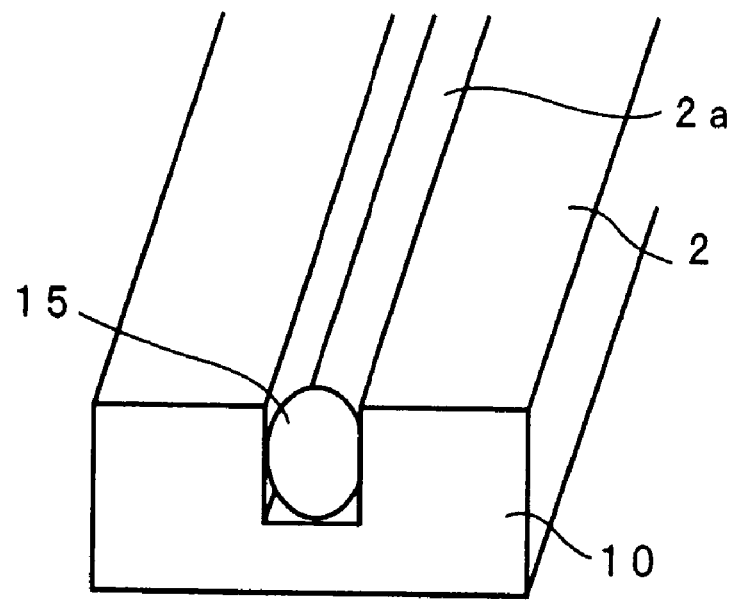
FIG. 28 is a perspective view showing a lower clad layer and a microlens in an optical waveguide of further another embodiment according to the first aspect of the present invention.
Figure 29:
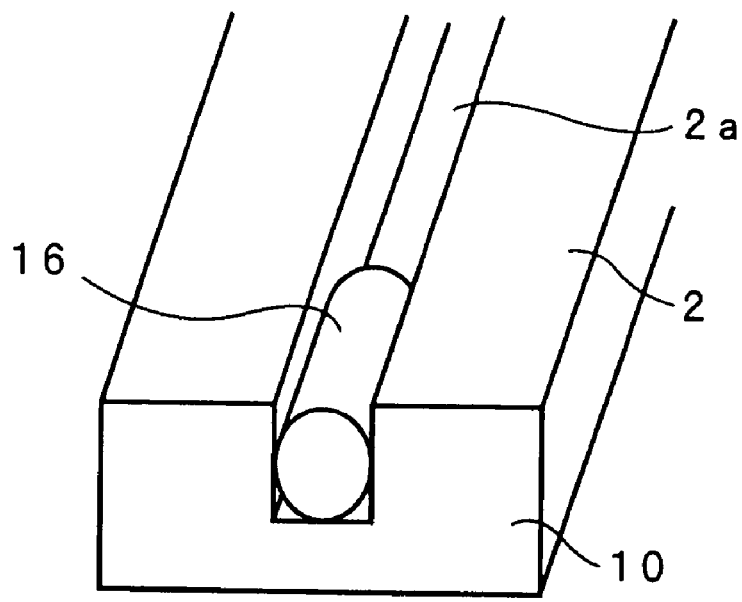
FIG. 29 is a perspective view showing a lower clad layer and a microlens in an optical waveguide of further another embodiment according to the first aspect of the present invention.

Further, as shown in FIG. 28, a spherical lens 15 having a cross section of ellipsoid, in which the major axis is vertical, may be used. In this case, in the groove 2a of the clad layer 2, depth is longer than width Further, as shown in FIG. 29, a cylindrical lens 16 having a cross section of ellipsoid may be used. In this case, depth is also longer than width in a groove 2a as with FIG. 28.

Figure 5:
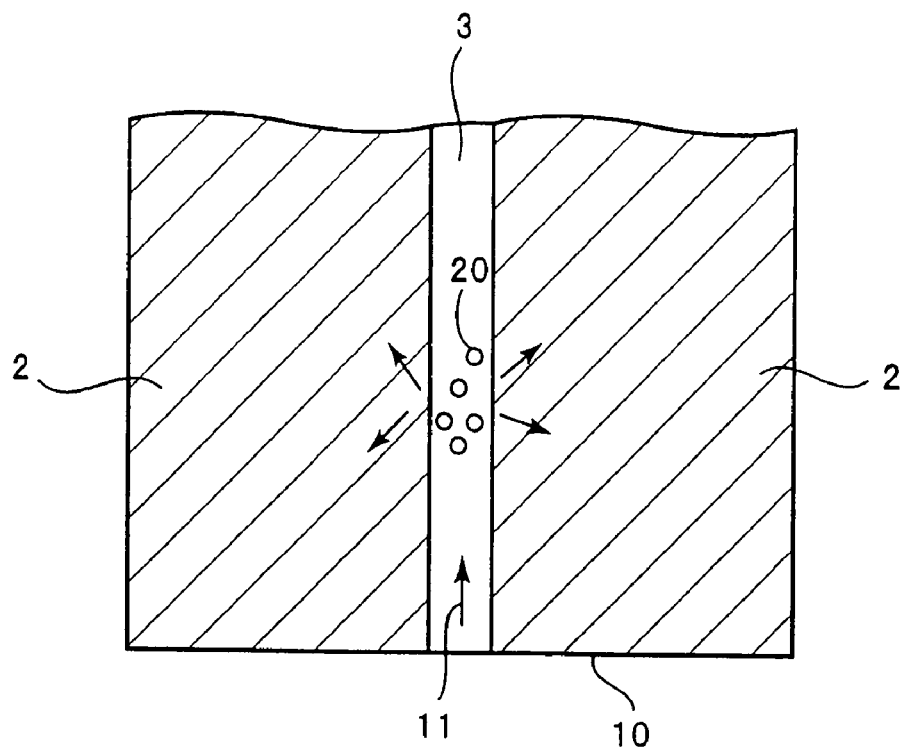
FIG. 5 is a sectional plan view showing an optical waveguide of an embodiment according to a second aspect of the present invention.

FIG. 5 is a sectional plan view showing an optical waveguide of an embodiment according to the second aspect of the present invention. In this embodiment, bubbles 20 are formed in the core layer 3. By forming bubbles 20 in the core layer 3, a light scattering region is formed. A waveguided light 11 having passed through an end face 10 of the optical waveguide is scattered by particles in this light scattering region and part of the scattered light is extracted out of the optical waveguide.

Figure 6:
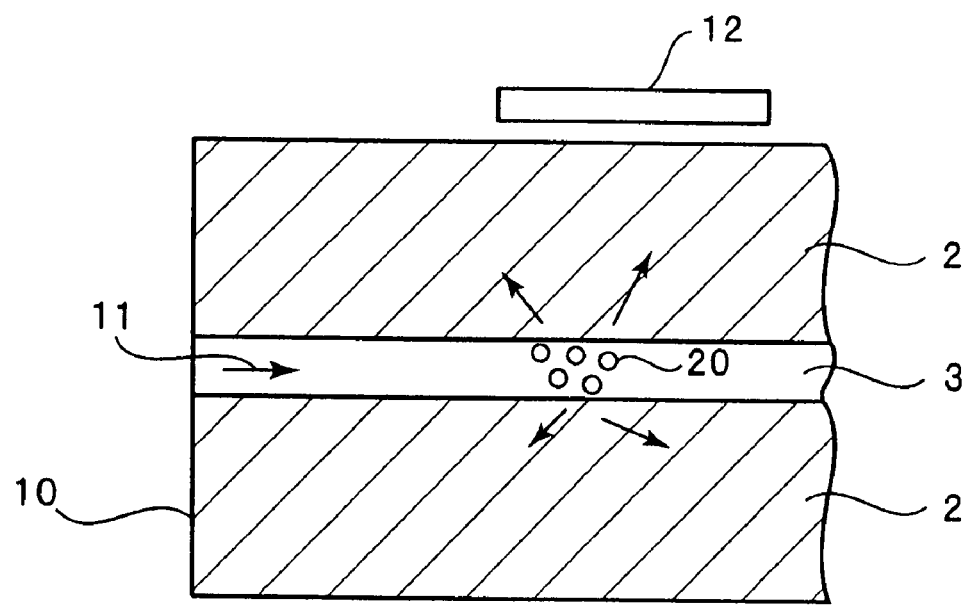
FIG. 6 is a sectional plan view showing an optical waveguide of another embodiment according to the second aspect of the present invention.

FIG. 6 is a sectional plan view showing a state of setting up a photodetector 12 outside a region of the optical waveguide where the light scattering region is formed. By setting up a photodetector 12 outside a region of the optical waveguide where the light scattering region is formed, part of the waveguided light scattered by the light scattering region can be detected. Therefore, in accordance with the second aspect of the present invention, light intensity of the waveguided light transmitted through the core layer can be easily measured.

In this embodiment, the light scattering region is formed to be 1 mm in length and the size of a bubble is 2 to 3 µm. And, the number of bubbles is about 20 to 30/mm³.

In the above embodiment, bubbles are formed in the core layer, but particles may be contained in place of the bubbles. As such the particles, there are given metal particles, glass particles and resin particles.

Figure 8:
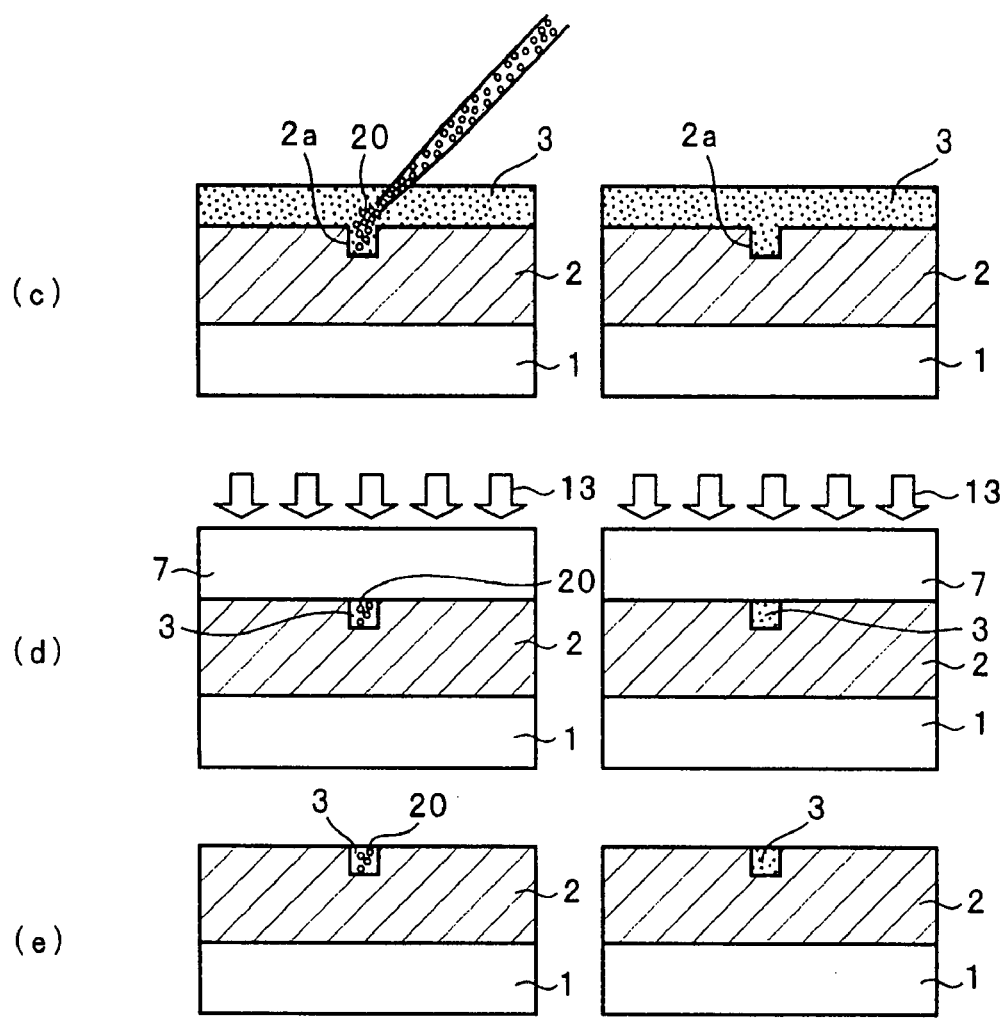
FIG. 8 is a sectional view showing fabrication steps of an embodiment according to the second aspect of the present invention.

FIGS. 7 and 8 are sectional views showing process steps of fabricating an optical waveguide according to the second aspect of the present invention.

As shown in FIGS. 7(a) and 7(b), a lower clad layer 2 having a groove 2a for forming a core layer is formed on a substrate 1 and a solution 3 for forming a core layer is added dropwise onto the lower clad layer 2 to form a layer.

Next, as shown in FIG. 8(c), a solution for forming a core layer containing bubbles is sucked up into a micropipet and this solution is injected into a groove 2a of a portion constituting the light scattering region while observing with a microscope. The solution for forming a core layer containing bubbles is prepared by bubbling nitrogen gas into the solution for forming a core layer through a porous filter (pore size 1 to 2 µm). Since the solution for forming a core layer is a highly viscous solution, the bubbles injected into the groove 2a remain in the groove 2a. Incidentally, the width and the depth of the groove 2a are 6 to 7 µm, respectively. In addition, as described above, the light scattering region formed by injecting bubbles has a length of 1 mm, the size of a bubble is 2 to 3 µm and the number of bubbles is about 20 to 30/mm³.

Next, as shown in FIG. 8(d), a flat plate 7 is placed on the solution 3 and the solution other than that in the groove 2a is extruded by applying a load 13. In this state, by irradiating ultraviolet light (365 nm) from the side of the substrate 1 to the solution for forming a core layer and curing it to form a core layer 3. As shown in FIG. 8(d), the optical waveguide becomes a state in which bubbles 20 are contained in only the light scattering region.

Next, as shown in FIG. 8(e), after the flat plate 7 is removed, a solution for forming an upper clad layer is added dropwise and by irradiating ultraviolet light to this solution, the solution for forming an upper clad layer is cured to form an upper clad layer.

Figure 9:
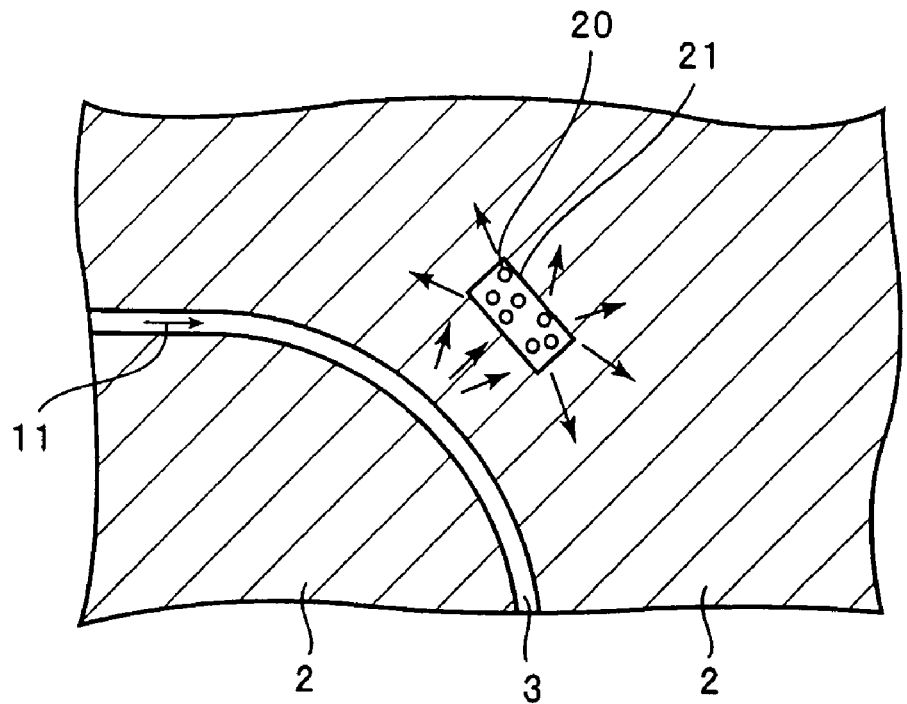
FIG. 9 is a sectional plan view showing an optical waveguide of an embodiment according to a third aspect of the present invention.

FIG. 9 is a sectional plan view showing an optical waveguide of an embodiment according to a third aspect of the present invention. In the embodiment shown in FIG. 9, a light scattering region 21, in which bubbles 20 are contained, is formed in a region of part of the lower clad layer 2. The light scattering region 21 is in a state that many bubbles 20 are formed in resin. Part of the waveguided light 11 transmitting through the core layer 3 is leaked out of the core layer 3 and scattered by the light scattering region 20, and part of the scattered light is extracted out of the optical waveguide. In the embodiment shown in FIG. 9, the core layer 3 has a curved portion and the light scattering region 21 is formed outside the curved portion. Accordingly, since the light leaked from the curved portion can be scattered by the light scattering region 21 and detected by a sensor, set up externally, such as a photodiode, losses at the curved portion can be measured.

Figure 10:
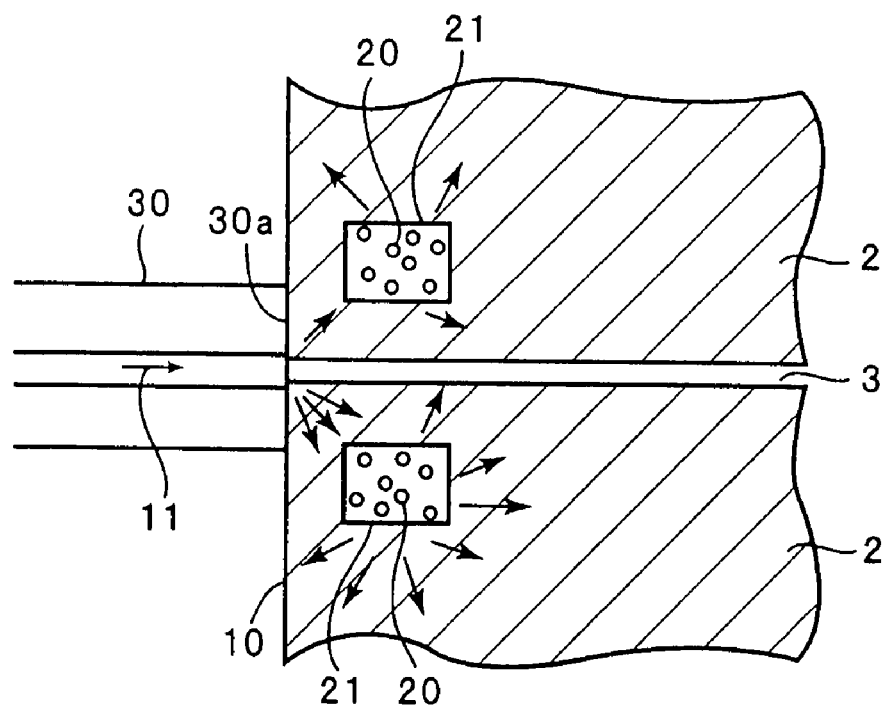
FIG. 10 is a sectional plan view showing an optical waveguide of another embodiment according to the third aspect of the present invention.

FIG. 10 is a sectional plan view showing an optical waveguide of another embodiment according to the third aspect of the present invention. In this embodiment, a light scattering region 21 containing bubbles 20 is formed in the vicinity of an end face 10 of the optical waveguide. An end face 30a of an optical fiber 30 is connected to the end face 10 of the optical waveguide and a waveguided light 11 is transmitted from the optical fiber 30 to the optical waveguide. In this embodiment, a coupling loss can be evaluated by scattering the emitted light generated due to a loss of coupling to an optical fiber 30 in the light scattering region 21 and detecting the scattered light by a sensor, set up outside the optical waveguide, such as a photodiode.

Figure 11:
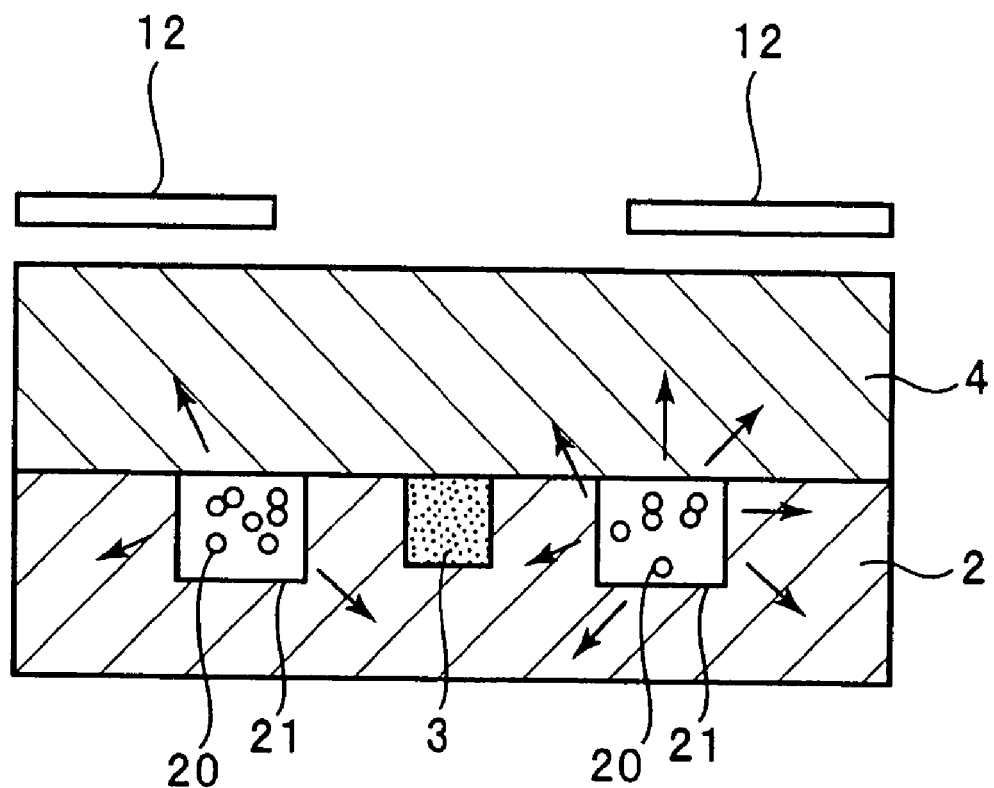
FIG. 11 is a longitudinal sectional view showing an optical waveguide of another embodiment according to the third aspect of the present invention.

As shown in FIG. 11, by forming the light scattering region 21 on both sides of a core layer 3 and setting up a photodetector 12 which detects light emitted from each light scattering region 21, it becomes possible to align the core layer in connecting the optical waveguide to an optical fiber, for example, by adjusting two photodetectors 12 in such a way that two intensity of signals become identical to each other.

In FIGS. 10 and 11, light scattering region 21 may be formed, for example, at a location 100 µm inwardly from the end face 10 and about 20 µm apart from the core layer 3. The size of the light scattering region may be, for example, a region of the order of several mm cube. And a bubble diameter is about 2 to 3 µm and the number of bubbles is about 20 to 30 per 1 mm$^3$ of the region.

Figure 12:
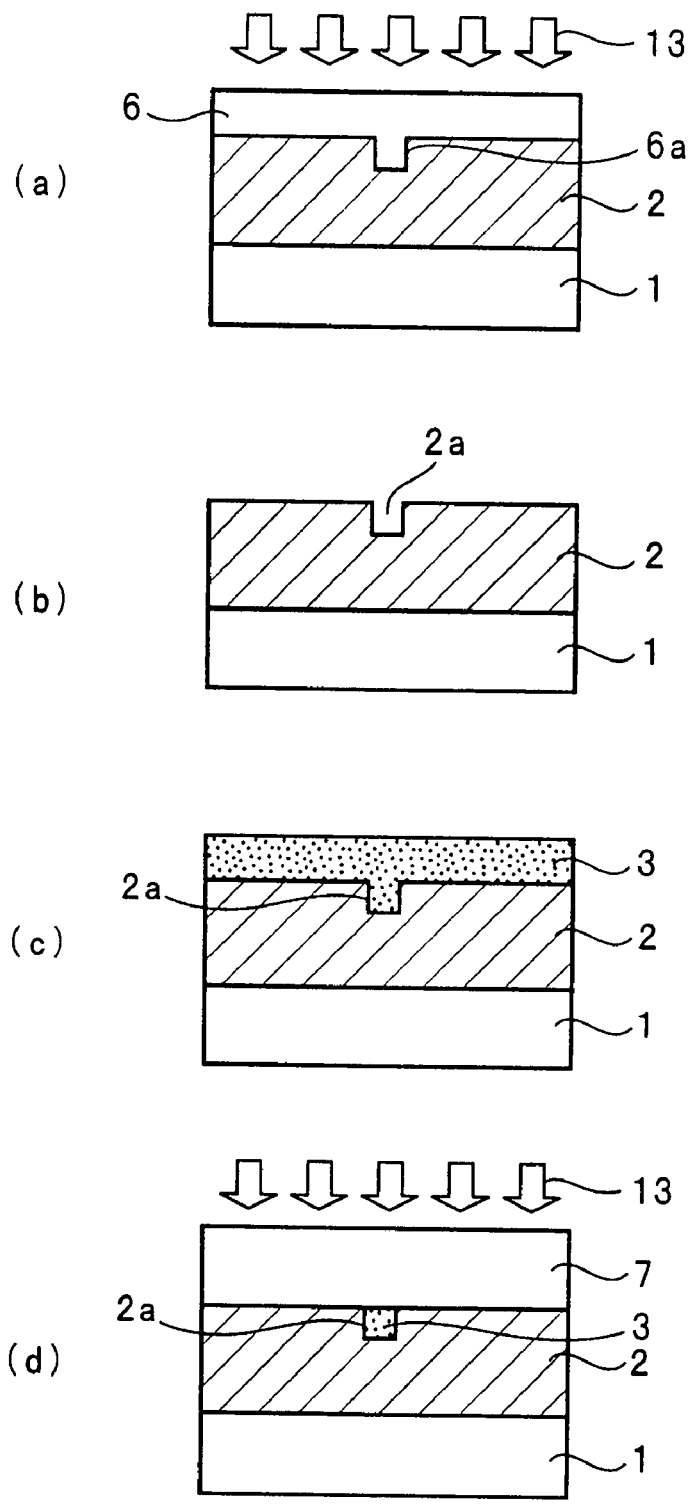
FIG. 12 is a sectional view showing process steps of fabricating an optical waveguide of an embodiment according to the third aspect of the present invention.
Figure 13:
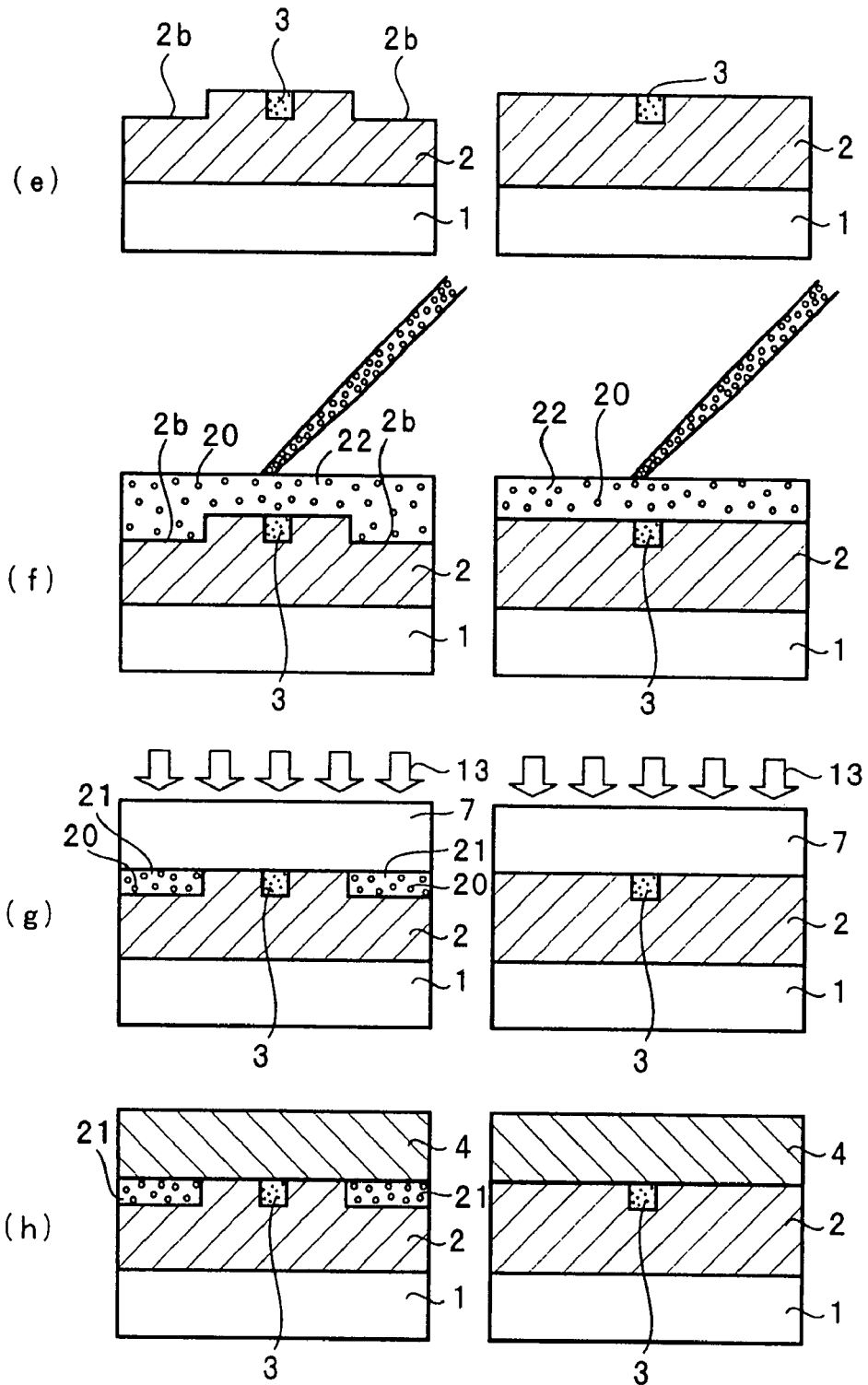
FIG. 13 is a sectional view showing process steps of fabricating an optical waveguide of an embodiment according to the third aspect of the present invention.

FIGS. 12 and 13 are sectional views showing process steps of fabricating an optical waveguide of an embodiment according to the third aspect of the present invention.

As shown in FIGS. 12(a) and 12(b), a solution 2 for forming a clad layer is added dropwise onto a substrate 1 to form a layer of a solution, and the layer of the solution is irradiated with ultraviolet light from the side of the substrate 1 with a mold 6 having a projection portion 6a being pressed against the layer of the solution and cured to form a clad layer 2 having a groove 2a for forming a core layer.

Next, as shown in FIG. 12(c), a solution 3 for forming a core layer is added dropwise and a flat plate 7 is placed on this and by irradiating ultraviolet light from the side of the substrate 1, the solution in the groove 2a is cured to form a core layer 3.

Next, the flat plate 7 is removed as shown in FIG. 13(e), and a portion, where an light scattering region is to be formed, of the lower clad layer is eliminated by dry etching technique to form two etching portions 2b on both sides of the core layer 3. Dry etching is carried out in such a way that depth of etching is 5 to 10 µm after forming a Ni mask (500 nm in thickness) on a region not to be etched by lift off. Conditions of dry etching are CF$_4$ gas flow rate: 10 sccm, degree of vacuum: 25 mTorr, RF power: 200 W, and reactive ion etching (RIE) mode. After etching, Ni mask is removed with dilute hydrochloric acid and sample becomes a state shown in FIG. 13(e).

Next, as shown in FIG. 13(f), a solution for forming a clad layer containing bubbles, which has been prepared in the same way as described above, is added dropwise onto the lower clad layer 2 and the etching portion 2b. After the solution placed on a region other than the etching portion 2b is removed with a spatula, as shown in FIG. 13(g), a flat plate 7 is placed on the solution and by irradiating ultraviolet light from the side of the substrate 1 with a load 13 being applied, the solution for forming a clad layer is cured to form a light scattering region 21.

Next, after removing the flat plate 7, as shown in FIG. 13(h), an upper clad layer 4 is formed.

Figure 14:
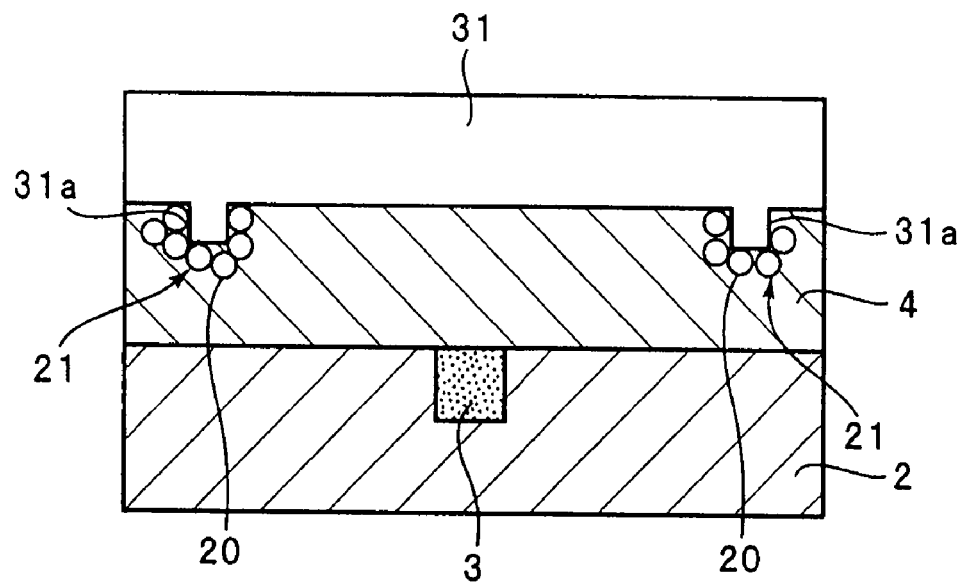
FIG. 14 is a longitudinal sectional view showing an optical waveguide of further another embodiment according to the third aspect of the present invention.

FIG. 14 is a longitudinal sectional view showing an optical waveguide of further another embodiment according to the third aspect of the present invention. In this embodiment, a light scattering region 21 containing bubbles 20 is formed in an upper clad layer 4. After a solution for forming an upper clad layer is added dropwise, a solution for forming a clad layer, prepared in the same way as described above and containing bubbles 20, is added dropwise onto a peripheral portion where a projection portion 31a is positioned with a micropipet to allow this portion to contain bubbles. Next, a mold 31 having the projection portion 31a is placed on the layer of the solution 4 for forming an upper clad layer, and bubbles 20 are concentrated in the vicinity of the projection portion 31a by applying a load. By irradiating ultraviolet light in this state and curing the solution, a light scattering region 21, in which bubbles 20 are concentrated in the vicinity of a top of the upper clad layer, can be formed. After curing, the mold 31 is removed. Configuration of the projection portion 31a of the mold 31 is, for example, about 20 to 50 µm in width and length, respectively, and about 20 µm in height. The mold 31 can be formed from, for example, resin or metal.

Figure 15:
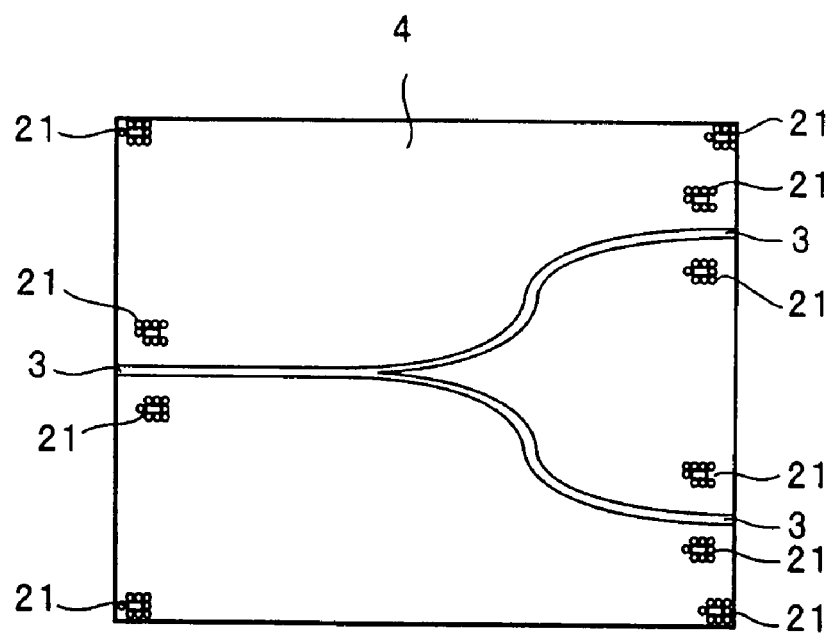
FIG. 15 is a plan view showing an optical waveguide of further another embodiment according to the third aspect of the present invention.

FIG. 15 is a plan view showing an optical waveguide in which a light scattering region 21 is formed above an upper clad layer 4 by a method shown in FIG. 14. As shown in FIG. 15, by forming a light scattering region 21 on both side of the core layer 3 of the vicinity of an end face, a mark for a position of the end face of core layer in the optical waveguide is prepared. Therefore, when connecting the core layer to an optical fiber, the light scattering region 21 can be employed as a mark for alignment.

Figure 16:
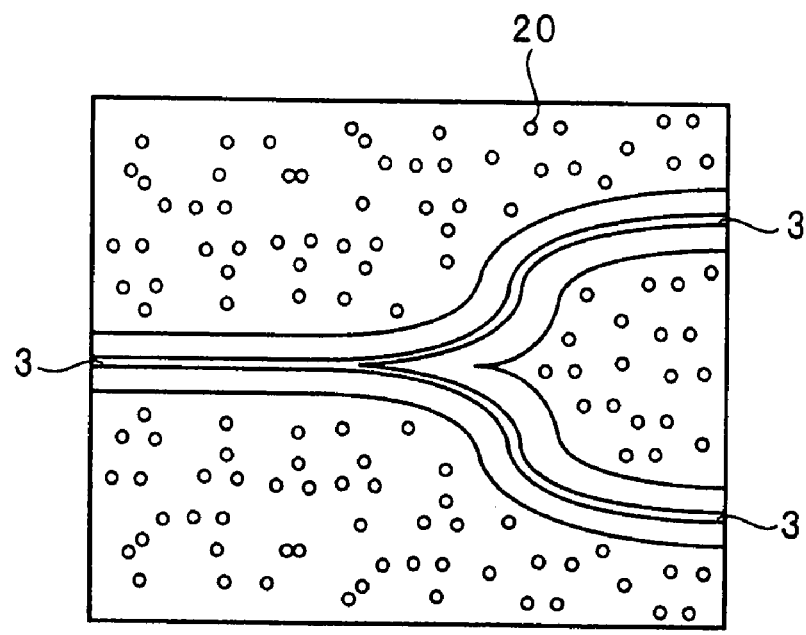
FIG. 16 is a plan view showing an optical waveguide of further another embodiment according to the third aspect of the present invention.

FIG. 16 is a plan view showing an optical waveguide of further another embodiment according to the third aspect of the present invention. In this embodiment, a region other than the core layer 3 contains many bubbles 20 and a region other than the vicinity of the core layer 3 is adapted so as to be easily identified by the light scattering region. Since it becomes easy to identify a position of the core layer 3 in the optical waveguide, assembling works such as coupling of optical fibers become easy.

Figure 17:
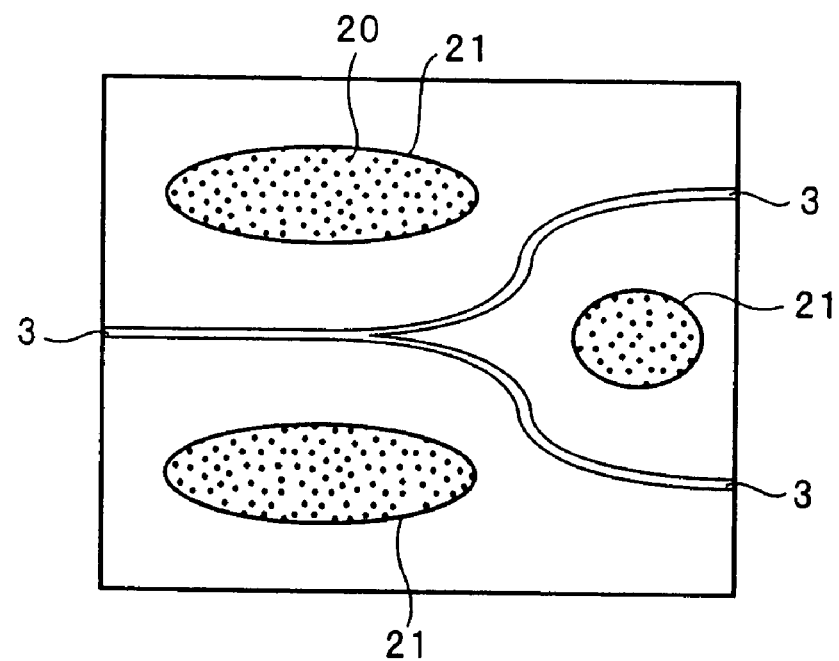
FIG. 17 is a plan view showing an optical waveguide of further another embodiment according to the third aspect of the present invention.

FIG. 17 is a plan view showing an optical waveguide of further another embodiment according to the third aspect of the present invention. In this embodiment, bubbles 20 are concentrically formed in a region other than the core layer 3 and an light scattering region 21 is formed in a restricted region other than the core layer 3. Since bubbles 20 are concentrated, bubble density becomes higher and the core layer 3 is easier to identify than the embodiment shown in FIG. 16.

FIGS. 18 and 19 is a sectional view showing process steps of fabricating an optical waveguide of an embodiment according to the third aspect of the present invention.

Process steps shown in FIGS. 18(a) to 18(d) are similar to that in FIGS. 12(a) to 12(d) and a lower clad layer 2 is formed on a substrate 1 and a core layer 3 is formed in a groove 2a in the lower clad layer 2.

Next, as shown in FIG. 19(e), in a portion where a light scattering region is to be formed, both sides of the lower clad layer 2 are dry etched and eliminated to form etching portions 2c by dry etching technique. Here, dry etching is carried out until the substrate 1 is exposed.

Next, as shown in FIG. 19(f), a solution for forming a clad layer containing bubbles 20 is added dropwise with a micropipet, and as shown in FIG. 19(g), a flat plate 7 is placed on the solution and in this state, ultraviolet light is irradiated from the side of the substrate 1 to the solution and the solution is cured to form a light scattering region 21 containing bubbles 20.

Next, as shown in FIG. 19(h), an upper clad layer 4 is formed on the lower clad layer 2, the core layer 3 and the light scattering region 21.

Figure 20:
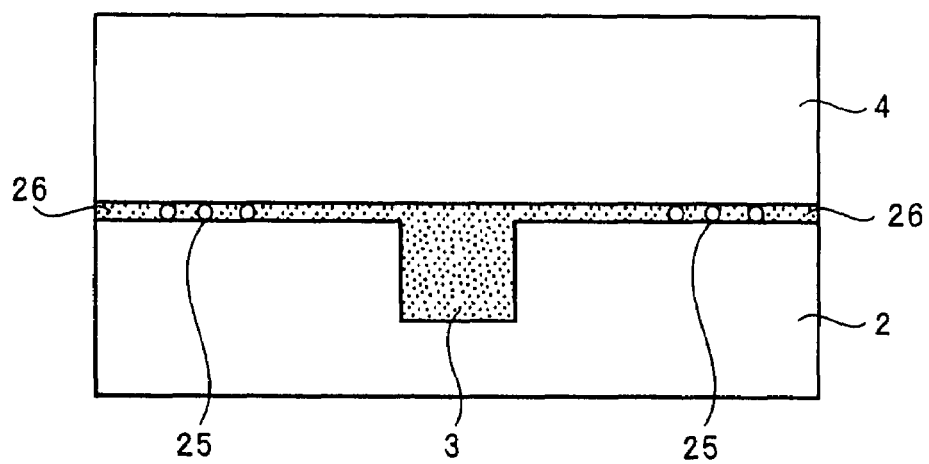
FIG. 20 is a sectional view showing an optical waveguide of an embodiment according to the fourth aspect of the present invention.

FIG. 20 is a sectional view showing an optical waveguide of an embodiment according to the fourth aspect of the present invention.

As shown in FIG. 20, spacers 25 are located between the upper clad layer 4 and the lower clad layer 2 around the core layer 3. By locating the spacers 25, the thickness of the residual layer 26 formed between the upper clad layer 4 and the lower clad layer 2 is controlled.

As a spacer used in the fourth aspect of the present invention, there can be used a spacer for a liquid crystal display described above and a standard particle used in the first aspect of the present invention. In this embodiment, a fine silica particle (trade name "HIPRESICA" manufactured by UBE-NITTO Corporation, average particle diameter 0.2 μm, refractive index 1.35 to 1.45) is used. As a spacer 25, a spacer having a lower refractive index is preferred. The leakage of light from the residual layer 26 can be reduced by employing a spacer having a lower refractive index. In this embodiment, the refractive index of the core layer 3 is 1.519, and the refractive indexes of the upper clad layer 4 and the lower clad layer 2 are 1.515, respectively. Therefore, the refractive index of the spacer 25 is lower than that of the core layer 3, the upper clad layer 4 and the lower clad layer 2.

In the fourth aspect of the present invention, the spacers 25 are preferably provided in a region about 10 μm or more away from the core layer 3. The reason for this is that optical transmission characteristics in the core layer are not affected.

And, in accordance with the fourth aspect of the present invention, the thickness of the residual layer 26 can be controlled by locating the spacers 25 as described above. And, since the thickness of the residual layer 26 is determined by the spacer 25, the uniformity of the thickness of the residual layer in the substrate of the optical waveguide is improved and also the reproducibility of the thickness of the residual layer is improved. In the case of a single mode waveguide, since the width and the depth of the core layer 3 are about 5 to 8 μm, the thickness of the residual layer 26 is preferably controlled so as to be 1.0 μm or smaller in the vicinity of the core layer 3. Further, in the case of a multi mode waveguide, since the width and the depth of the core layer 3 are about 50 μm, the thickness of the residual layer 26 is preferably controlled so as to be 10 μm or smaller in the vicinity of the core layer 3.

Figure 21:
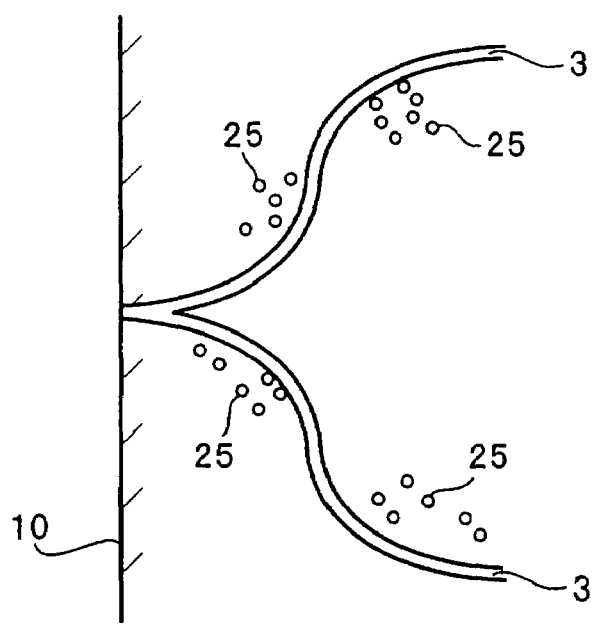
FIG. 21 is a plan view showing an optical waveguide of another embodiment according to the fourth aspect of the present invention.
Figure 22:
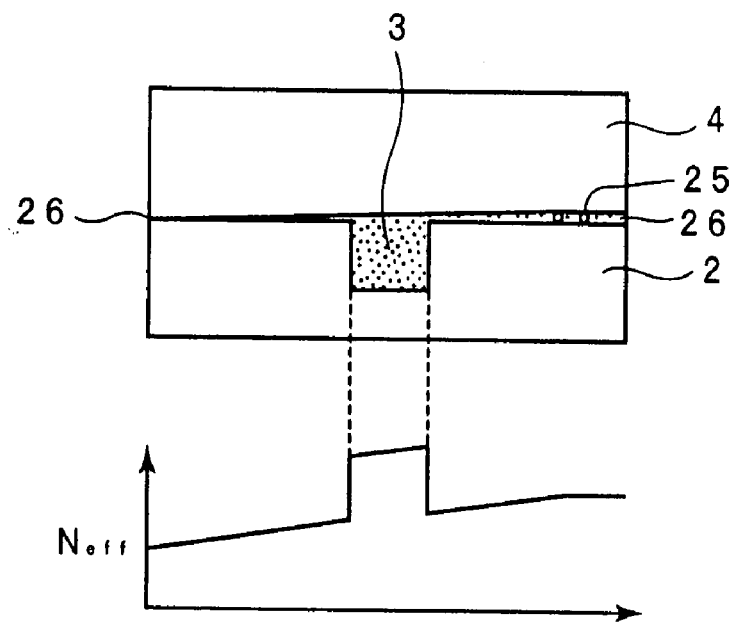
FIG. 22 is a sectional view showing an optical waveguide of another embodiment according to the fourth aspect of the present invention.

FIG. 21 is a plan view showing further another embodiment according to the fourth aspect of the present invention. In this embodiment, as shown in FIG. 21, the spacers 25 are located in only an inside region of the curved portion of the core layer 3. FIG. 22 is a longitudinal sectional view of a region where spacers are located. As shown in FIG. 22, in both regions straddling the core layer 3, the spacers 25 are located in only one region. Therefore, the thickness of the residual layer 26 on the side where the spacers 25 are located is thickened and the thickness of the residual layer 26 on the opposite side is thinned.

Figure 23:
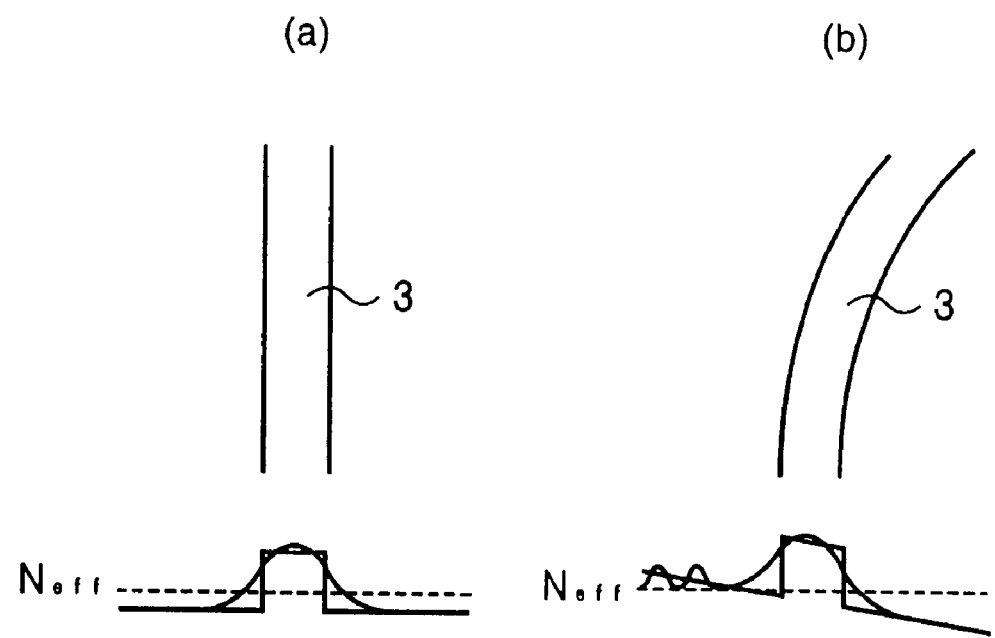
FIG. 23 is a profile showing a state of distribution of effective indexes $N_{eff}$ at a straight portion and a curved portion of a core layer.

As shown in FIG. 23(a), when a core layer 3 is straight, effective indexes $N_{\mathit{eff}}$ on both sides of the core layer 3 are identical to each other. As shown in FIG. 23(b), when a core layer 3 is curved, effective index $N_{\mathit{eff}}$ inside a curved portion becomes low but effective index $N_{\mathit{eff}}$ outside a curved portion becomes high. Therefore, leakage of waveguided light occurs at the outside of the curved portion and loss of light is generated.

In this embodiment, the spacers are located in only an inside region of the curved portion to thicken the thickness of the residual layer 26 inside the curved portion and to thin the thickness of the residual layer 26 outside the curved portion. That is, the thickness of the residual layer 26 is varied and graded so as to become thin in the direction of from the inside to the outside of the curved portion. Therefore, as shown in FIG. 22, the effective index $N_{\mathit{eff}}$ outside the curved portion can be reduced. Accordingly, the loss of light generated at the outside of the curved portion can be reduced.

As with the embodiments shown in FIGS. 21 and 22, in both sides straddling the core layer, when by locating spacers in only one side, the thickness of the residual layer is controlled so as to thin from one side to the other side, the spaces are preferably located in a position about 50 μm away from the core layer. And, spacers used in this case may be one having a relatively large size and therefore spacers used in a liquid crystal display are enough to be used. For example, spacers made from silica, having a particle diameter of 5 to 10 μm, can be used.

And, by providing spacers 25 in both sides straddling the core layer and changing particle diameters of the spacers between both sides of the core layer, the thickness of the residual layer may be controlled so as to be graded.

FIG. 24 is a plan view showing an optical waveguide of further another embodiment according to the fourth aspect of the present invention. An optical waveguide 42 is coupled to one end face 10a of an optical waveguide 41. And, an optical waveguide 43 is coupled to the other end face 10b of an optical waveguide 41. The width and the depth of the core layer 3 of the optical waveguide 41 are 8 μm, respectively, and the width and the depth of the core layer 33 of the optical waveguide 42 are 8 μm, respectively. On the other hand, the width and the depth of the core layer 32 of the optical waveguide 43 are 9 μm, respectively, and they are larger than that of the core layer 3.

In the optical waveguide 41, spacers 25 are located in both regions straddling the core layer 3 of the vicinity of the end face 10b coupled to the optical waveguide 43. Therefore, the thickness of the residual layer becomes thick in the vicinity of the end face 10b. On the other hand, spacers are not located in the vicinity of the end face 10a coupled to the optical waveguide 42. Since the thickness of the residual layer can be thickened by locating spacers 25 in a region of the vicinity of the end face 10b, it is possible to widen a region of light exiting the end face 10b and to enhance a coupling property to the core layer 32 which is more broad than that of the core layer 3.

In the embodiment shown in FIG. 24, the spaces 25 are preferably provided in a region about 50 μm away from the core layer 3 and the spaces 25 having a particle diameter of 5 to 10 μm are preferably used.

Figure 26:
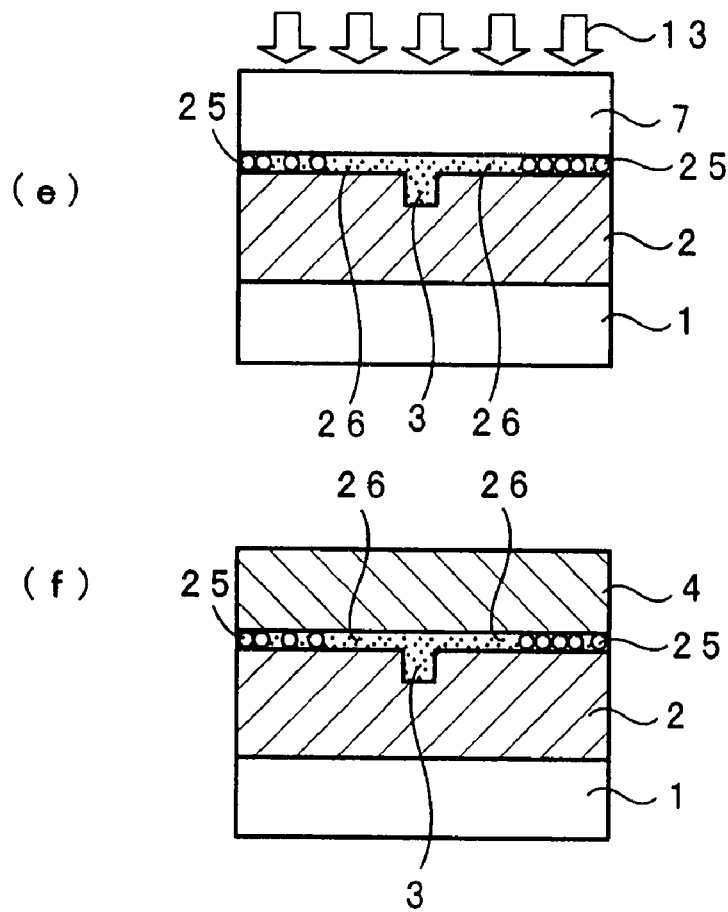
FIG. 26 is a view showing process steps of fabricating an optical waveguide of an embodiment according to the fourth aspect of the present invention.

FIGS. 25 and 26 are sectional views showing process steps of fabricating an optical waveguide of an embodiment illustrated in FIG. 20.

As shown in FIG. 25(a), a solution 2 for forming a lower clad layer is added dropwise onto the substrate 1 and then a mold 6 having a projection portion 6a is placed on the solution 2 to apply a load 13, and in this state, ultraviolet light is irradiated from the side of the substrate 1. The width and the height of the projection portion 6a are 6 to 7 μm, respectively. As shown in FIG. 25(b), a lower clad layer 2 having a groove 2a for forming a core layer is formed, and as shown in FIG. 25(c), a solution 3 for forming a core layer is added dropwise onto the lower clad layer 2.

After the unnecessary solution 3 for forming a core layer is removed with a spatula or the like, as shown in FIG. 25(d), a metal mask 34 is set up above a core layer 3. The metal mask 34 is a cover to prevent spacers from adhering to regions of the order of 10 μm on both sides of a core layer 3. Therefore, the metal mask 34 has a width of about 25 to 30 μm. Next, spacers 25 are dropped in a dispersed state from above the metal mask 34 and spacers 25 adhere to regions, uncovered with the metal mask 34, on the lower clad layer 2.

Next, as shown in FIG. 26(e), a flat plate 7 is placed on the spacers 25 and by irradiating ultraviolet light from the side of the substrate 1 with a load 13 being applied, a portion, in where the core layer 3 and the spacers 25 are located, of the residual layer, is cured.

Next, after removing the flat plate 7, as shown in FIG. 26(f), an upper clad layer 4 is formed on the core layer 3 and the residual layer 26.

Also in the embodiment shown in FIGS. 21, 22 and 24, the respective layer can be fabricated by process steps similar to that described above using a metal mask for locating spacers at only predetermined position in each embodiment.

What is claimed is:

1. An optical waveguide comprising;
   a core layer to be an optical transmission region;
   an upper clad layer and a lower clad layer covering said core layer; and
   particle form spacers or rod form spacers contained in a residual layer disposed between said upper clad layer and said lower clad layer around said core layer, said residual layer being an integrated layer with said core layer, wherein
   said core layer, said upper clad layer, and said lower clad layer are formed from resin materials.

2. The optical waveguide according to claim 1, wherein said spacers are disposed in only one region of both regions straggling said core layer.

3. The optical waveguide according to claim 2, wherein in a curved portion of said optical transmission region, said spacers are disposed only in an inside region of the curved portion.

* * * * *